(12) United States Patent
Serban et al.

(10) Patent No.: US 7,935,324 B2
(45) Date of Patent: May 3, 2011

(54) INTEGRATED WARM GAS DESULFURIZATION AND GAS SHIFT FOR CLEANUP OF GASEOUS STREAMS

(75) Inventors: Manuela Serban, Glenview, IL (US); Tom N. Kalnes, LaGrange, IL (US); Kurt M. Vanden Bussche, Lake in the Hills, IL (US); John P. Brady, Algonquin, IL (US); Robert B. James, Jr., Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/328,496

(22) Filed: Dec. 4, 2008

(65) Prior Publication Data
US 2010/0143225 A1 Jun. 10, 2010

(51) Int. Cl.
| | |
|---|---|
| B01D 53/48 | (2006.01) |
| B01D 53/62 | (2006.01) |
| B01D 53/02 | (2006.01) |
| B01D 53/86 | (2006.01) |
| B01D 53/96 | (2006.01) |
| C01B 17/16 | (2006.01) |
| C01B 31/20 | (2006.01) |
| B01J 8/00 | (2006.01) |

(52) U.S. Cl. ..... 423/224; 423/220; 423/230; 423/242.1; 423/244.01

(58) Field of Classification Search .......... 423/220, 423/224, 226, 230, 242.1, 244.01
See application file for complete search history.

(56) References Cited

U.S. PATENT DOCUMENTS

| | | | |
|---|---|---|---|
| 2,649,166 A | 8/1953 | Porter et al. | |
| 2,863,527 A | 12/1958 | Herbert et al. | |
| 2,926,751 A | 3/1960 | Kohl et al. | |
| 3,362,133 A | 1/1968 | Kutsher et al. | |
| 3,505,784 A | 4/1970 | Hochgesand et al. | |
| 4,110,359 A | 8/1978 | Marion | |
| 4,202,167 A | 5/1980 | Suggitt et al. | |
| 4,536,381 A | 8/1985 | Blytas | |
| 4,981,661 A | 1/1991 | Borsboom et al. | |
| 5,045,222 A | 9/1991 | Endo et al. | |
| 5,130,288 A | 7/1992 | Delzer et al. | |
| 5,254,516 A | 10/1993 | Gupta et al. | |
| 5,281,445 A | 1/1994 | Khare | |
| 5,306,685 A | 4/1994 | Khare | |
| 5,441,990 A | 8/1995 | Robin et al. | |
| 6,479,429 B1 | 11/2002 | Khare | |
| 7,067,093 B2 | 6/2006 | Vierheilig et al. | |
| 2002/0004533 A1* | 1/2002 | Wallace et al. | 518/712 |
| 2002/0023538 A1* | 2/2002 | Agarwal et al. | 95/108 |
| 2004/0170549 A1 | 9/2004 | Vierheilig et al. | |
| 2007/0283812 A1* | 12/2007 | Liu et al. | 96/150 |
| 2010/0011955 A1* | 1/2010 | Hufton et al. | 95/136 |

OTHER PUBLICATIONS

"Selexol™ Process." UOP LLC pamphlet (2002), pp. 1-2.*

* cited by examiner

*Primary Examiner* — Timothy C Vanoy
*Assistant Examiner* — Daniel Berns
(74) *Attorney, Agent, or Firm* — Mark Goldberg

(57) ABSTRACT

The present invention involves a catalytic process for purifying a gas stream comprising purifying the gas stream at a temperature from about 250° to 550° C. by removing sulfur compounds and including a gas shift reaction to convert carbon monoxide to carbon dioxide to produce a partially purified gas stream. The warm gas stream purification involves COS hydrolysis and hydrogenation to $H_2S$, the removal of $H_2S$, and a CO gas shift to convert CO to $CO_2$ to produce a partially purified stream. Then the carbon dioxide and other impurities are removed from the partially purified gas stream.

26 Claims, 2 Drawing Sheets

INTEGRATED WARM GAS DESULFURIZATION AND GAS SHIFT FOR CLEANUP OF GASEOUS STREAMS

BACKGROUND OF THE INVENTION

This invention relates to the production of a purified gas from a gas mixture containing carbon monoxide and various contaminants including carbon dioxide, hydrogen sulfide and carbonyl sulfide. More specifically, the present invention relates to an integrated process that operates at temperatures about 250° to 550° C. to both remove sulfur compounds and to perform a gas shift reaction to convert carbon monoxide to carbon dioxide which then can be removed from the gas stream.

Numerous methods for removal of acid gas from gas mixtures containing the same are well known in the art and in commercial practice. Included among the known processes for acid gas removal from gaseous streams are those employing physical absorption of $CO_2$ and/or $H_2S$ as distinguished from other processes involving chemical reaction. The physical processes are particularly preferred when the feed gas to be treated is available at high pressure and contains relatively large quantities of acid gas constituents and selective separation is desired. Numerous and diverse organic solvents have been suggested or utilized for the desired absorption. Included among the solvents used in known commercial process is methanol, employed in the Rectisol process licensed by Linde Engineering (U.S. Pat. No. 2,863,527); N-methyl-2-pyrrolidone, used in the Lurgi Purisol process (U.S. Pat. No. 3,505,784); propylene carbonate, used in the Fluor Solvent process (U.S. Pat. No. 2,926,751); and dimethyl ethers of polyethylene glycol, used in the UOP Selexol process (U.S. Pat. No. 2,649,166; U.S. Pat. No. 3,362,133). In addition to the many different types of absorption solvents heretofore used or proposed for use in desulfurization and $CO_2$ removal from gas mixtures, a variety of differences in operation techniques and process conditions appear in the patented art and published technical literature. The more widely adopted systems, however, in general, follow an operational sequence that may be characterized as conventional as described below.

In these conventional processes for desulfurization and removal of $CO_2$ from gas mixtures, such as those obtained by partial oxidation of heavy oils or by gasification of coal, the presence of COS in the feed poses difficulties in desulfurization when physical solvent absorption systems are employed. In such conventional processes, the feed gas is charged to an absorption column where it is contacted with the selected physical solvent for absorption of $H_2S$ and COS. This desulfurized gas is subjected to a catalytic shift reaction with steam with the CO converted to $CO_2$ and hydrogen is then obtained. The resulting gaseous effluent from the shift converter is treated with a suitable solvent for absorption of $CO_2$ and the resulting gaseous effluent is sent to a methanation section for hydrogenation of residual CO and $CO_2$, obtaining a hydrogen-rich gas product. The spent liquor from the desulfurizing absorber is stripped of contained $H_2S$ and COS, providing a product gas from which sulfur values may be recovered in a Claus plant and the lean solvent is recycled for reuse in further treatment of feed gas. The spent solvent from the $CO_2$ absorber is flashed to remove a portion of the $CO_2$, and then stripped of residual $CO_2$ with air or inert gas and the stripped liquid is recycled for reuse in the $CO_2$ absorber column.

The utility requirements for the operation of such conventional processes are comparatively costly. In some of these conventional processes solvent flows required for COS removal in desulfurization results in a dilute Claus gas (typically containing about 11-12 mol-% $H_2S$) which is too dilute for processing in conventional Claus plants for recovery of sulfur values. Accordingly, special expensive Claus plants need to be used, which require high purity oxygen instead of air for burning a part of the $H_2S$ to $SO_2$ or a sulfur product recycle oxidation. In addition, such processes require special expensive Claus tail gas units.

Other conventional processes for desulfurization of feed gas mixtures, such as those employing methanol as solvent for the sulfur gas, have been designed to produce a Claus gas of sufficiently high $H_2S$ content that can be charged to a conventional Claus gas system. In such Claus sulfur recovery systems, a thermal recovery stage in which the acid gas is burned in a reaction furnace with air or oxygen to combust about one-third of the hydrogen sulfide plus any hydrocarbons and ammonia in the acid gas. The sulfur dioxide from the combustion reacts in the reaction stages with the unconverted hydrogen sulfide to form elemental sulfur. The products of both the combustion and the reaction are cooled in a waste heat boiler and thermal sulfur condenser to recover the sulfur. These systems, however, need to make use of an extra column to concentrate the $H_2S$. Other conventional processes for desulfurization of gas mixtures obtain a Claus feed containing from about 20% to over 50% $H_2S$. The solvents generally employed in such processes, such as, for example, methanol, N-methyl pyrrolidone or dialkyl ethers of polyethylene glycol, are such that the solubility of $H_2S$ therein is much greater than that of $CO_2$, while the solubility of COS is intermediate of these. When COS is absent the desulfurization solvent flow rate is set for essentially complete $H_2S$ removal and only a small fraction of the $CO_2$ is coabsorbed, so that the desired concentration Claus feed is obtained. When COS is present, however, a substantially higher solvent flow rate is required to obtain complete absorption and desulfurization, with consequent increase in equipment costs and utility requirements. The coabsorption of $CO_2$ is also increased by the higher solvent flow rate and deep flashing of the rich solvent must be utilized to obtain a satisfactory Claus feed containing a required minimum of about 20% $H_2S$. In addition to the foregoing drawbacks, the increased compression requirements for the flash gas add substantially higher capital investment in equipment and higher power costs.

The hereinabove described difficulties and other drawbacks of these earlier known processes for desulfurization of gas mixtures are largely avoided in accordance with the process of the present invention and the economics of the operation are favorably improved, as will hereinafter appear.

Regardless of the carbon source and gasification process, the generated fuel or synthesis gas has to be substantially cleaned before being either burned in a gas turbine or used for chemical synthesis, e.g., methanol, ammonia, urea production, or Fischer-Tropsch synthesis. The clean-up of hot fuel gases avoids the sensible heat loss due to the cooling and subsequent reheating associated with the wet scrubbing techniques referenced above that use either chemical or physical solvents. Ideally, the clean-up of the fuel gas is done at the highest temperature that the fuel gas distribution system can be designed at. This could improve greatly the overall process efficiency, however, there are significant hurdles that need to be overcome before such a hot-fuel gas clean-up system is made commercially available. Only the hot particulate removal systems, i.e., candle filters or sintered metal filters, have been successfully demonstrated commercially for long term applications in a temperature range of 200° to 250° C. at the Nuon's Shell coal gasification plant in The Netherlands, and 370° to 430° C. in the E-Gas coal/coke gasification system at the Wabash River plant. All large scale warm desulfurization demonstration units have failed mostly due to inappropriate sulfur-scavenger materials. Also, with the current state of development of hot gas cleanup systems, all the other contaminants besides the S-compounds and solid particulates can not be removed at equally high temperatures. In addition, due to likely $CO_2$ regulations, all integrated gasification combined cycle (IGCC) gasifiers will need to be equipped with at least one CO-shift reactor, thus requiring cooling the fuel gas to temperatures adequate for the water gas shift catalytic reaction.

SUMMARY OF THE INVENTION

The present invention involves a process for purifying a warm gas stream using a solid catalyst. This gas stream is at a temperature from about 250° to 550° C. and preferably between 400° and 500° C. The purification comprises removal of sulfur compounds combined with a CO gas shift reaction to convert carbon monoxide to carbon dioxide to produce a partially purified gas stream. The warm gas stream purification comprises the COS hydrolysis and hydrogenation to $H_2S$, the removal of $H_2S$, and the CO gas shift to convert CO to $CO_2$ to produce a partially purified stream. Subsequently, the carbon dioxide and other impurities can be removed to result in a purified gas stream.

DETAILED DESCRIPTION OF THE INVENTION

Figure 1:
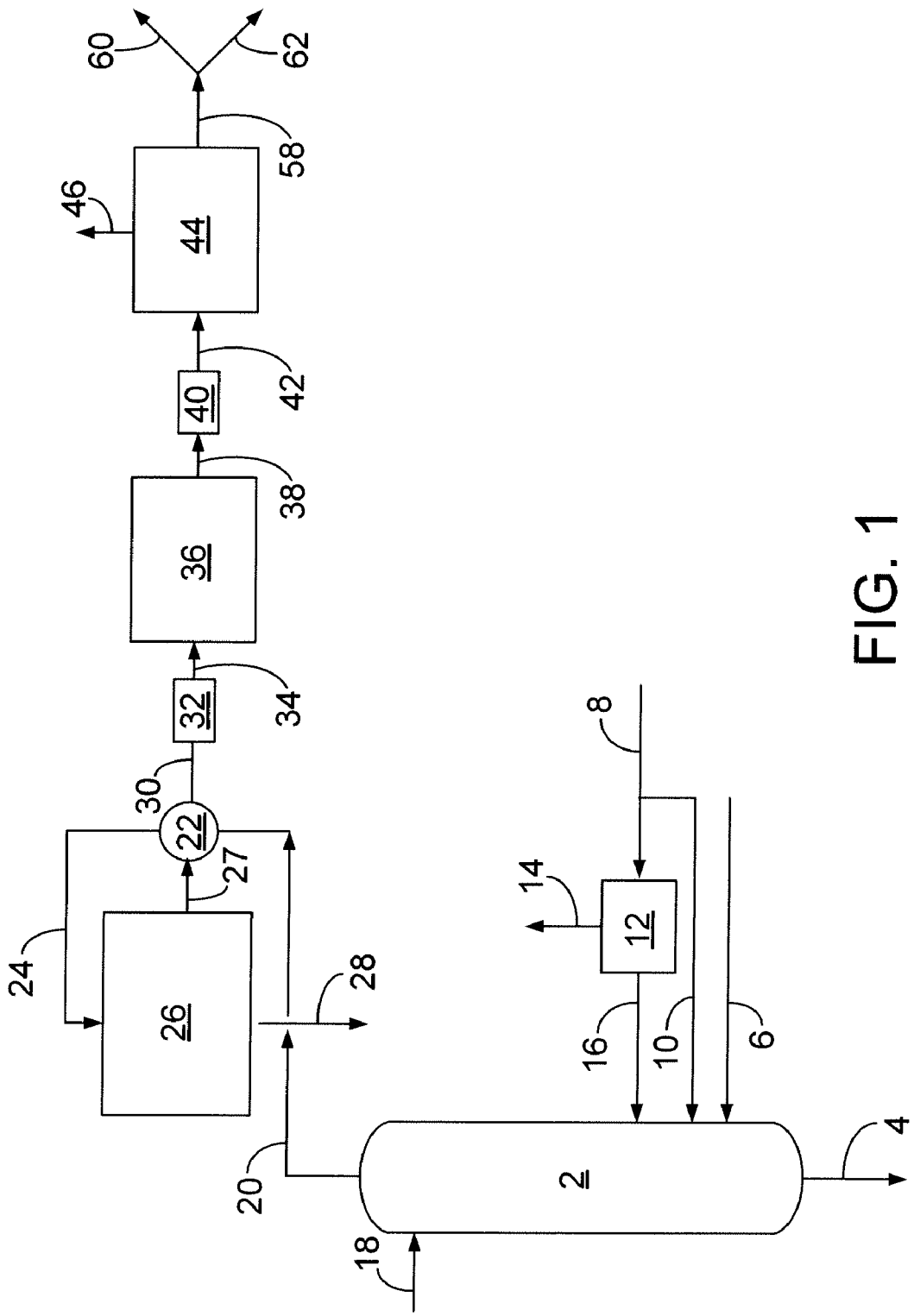
FIG. 1 shows the integrated unit for the complete removal of sulfur compounds plus a CO-shift process in which solvent based purification units are used for removal of carbon dioxide and other impurities.

This invention involves the integration of the complete desulfurization ($H_2S$ and COS removal) process with the CO-shift process in the temperature range 250° to 550° C. using a solid catalyst to maximize hydrogen production from fuel gas and hence facilitate the capture of the clean, concentrated $CO_2$. The $CO_2$ stream can be captured and concentrated downstream of the integrated desulfurization and CO-shift unit using either a physical solvent process (FIG. 1), or alternatively by using high temperature $CO_2$ absorbents (FIG. 2). This concept represents the next generation of synthesis gas treating and applies not only in the power generation industry but also in the production of chemicals and fuels.

This invention involves the integration of the COS hydrolysis and hydrogenation process, with the $H_2S$ removal process, and with the CO-shift process in the temperature range 250° to 550° C. using a solid catalyst to maximize hydrogen production from fuel gas and hence facilitate the capture of the clean, concentrated $CO_2$. The $CO_2$ stream can be captured and concentrated downstream of the integrated desulfurization and CO-shift unit using either a physical solvent process, or alternatively by using high temperature $CO_2$ absorbents.

All large scale commercially proven coal gasification processes offered by the major solid-feedstock gasification technology vendors are slurry-fed or dry-fed entrained-flow high-temperature gasifiers. Entrained-flow gasifiers dominate the gasification market because of the maximum feedstock flexibility, maximum CO and $H_2$ generation (high carbon conversion and no tars production) and production of an inert vitrified slag. In addition, they also enable cheaper CO shifting to reduce the cost of hydrogen, which is important for coal-to-liquid processes and carbon capture. Due to the very high operating temperatures, the entrained-flow gasifiers have however a relatively high oxygen requirement and waste heat recovery duty, since a high amount of the feedstock energy is converted to sensible heat in the raw syngas. Maximizing the overall gasification system efficiency depends on the effective recovery of this sensible heat in a syngas cooler, or in a direct water quench step. The quench mode design significantly reduces the capital cost of syngas cooling while heat integration maintains good overall thermal efficiency. Also, the quench mode is advantageous if significant downstream shifting of the syngas to $CO_2$ and $H_2$ is desired as the raw syngas becomes saturated with steam generated by evaporation of a portion of the quench water. The entrained-flow slurry-fed gasification with direct water quenching is the preferred and commonly used option of GE Energy, and now, in view of the potential future $CO_2$ regulations, even Shell, Lurgi and Siemens offer the water quenching cooling method. In addition to efficiently cooling the raw syngas and recovering part of the sensible heat, significant decontamination takes place in the quenching step. Solid particulates, alkali metals, non-volatile metals, chlorides, the bulk of metal carbonyls and part of ammonia are all removed in the water quenching step. The contaminants left in the raw syngas after the water quenching step include about 50-100 ppmv ammonia, 1 to 4 ppmv Ni and Fe carbonyls, about 50-100 ppmv HCN, Hg, As, and sulfur-containing gases, including $H_2S$ and COS. All of these contaminants have to be removed before the syngas is either burned in a gas turbine or used for chemical synthesis.

Currently, regenerable solvent-type acid gas removal processes are used in both IGCC and chemical synthesis applications. Selexol, UOP's physical solvent acid gas removal process is used commercially mostly for IGCC applications and in one gasification-based ammonia/urea plant. The Selexol process could remove both $H_2S$ and COS to low levels but with very high overall unit costs that require refrigerating the solvent to 4° C. (40° F.). A cheaper configuration would, however, allow much of the COS to bypass the absorber, because of the absorbent's poor selectivity between COS and $CO_2$. If high levels of COS removal are to be achieved, then a COS hydrolysis unit may still be required.

Our proposed concept of integrating the fuel gas complete desulfurization with the water gas shift catalytic reaction in one process unit would address the above issues associated with Selexol. There are two main advantages associated with this concept: on one hand, the equipment costs could be greatly reduced and on the other hand, by removing continuously the $H_2S$, the COS hydrolysis equilibrium will be shifted completely to the right, while at the same time the hydrogen production will be maximized via the CO-shift reaction. This will facilitate the capture of the clean, concentrated $CO_2$ stream in a simpler/smaller solvent scrubbing unit, e.g., Selexol, or alternatively with high temperature $CO_2$ sorbents.

Dimethyl ethers of polyethylene glycol and water, the physical solvent used in Selexol, could remove both $H_2S$ and COS to very low levels if refrigerated to 4° C. (40° F.) but at the expense of appreciable $CO_2$ co-adsorption, very high solvent circulation rate and high solvent regeneration expense. This results in low $H_2S$ concentration of the acid gas going to the Claus unit, and overall, in very high unit costs. Several absorption, flash, and regeneration stages are used if both deep sulfur removal and high $H_2S$ over $CO_2$ selectivity are required. A cheaper configuration that would result in a higher $H_2S$ content acid gas to the Claus unit, would however allow much of the COS to bypass the absorber because of the poor selectivity between COS and $CO_2$. A COS hydrolysis unit would be needed if both high $H_2S$ concentration (low $CO_2$ concentration) in the acid gas and high COS removal are required.

Our integrated fuel gas desulfurization ($H_2S$ and COS removal) and water gas shift process addresses the above issues associated with solvent based systems. By simultaneously removing $H_2S$ while performing the COS hydrolysis reaction, the hydrolysis equilibrium will be shifted completely by the continuous removal of one of the products of reaction. At the same time the hydrogen production will be maximized via the CO-shift reaction and the clean, concentrated $CO_2$ stream can be captured in a simpler/smaller solvent unit, or alternatively with high temperature $CO_2$ sorbents. The concept of combining the desulfurization with the water gas shift in one process unit has a significant impact on the overall complexity of a Selexol unit. The $H_2S$ trim absorber column placed after the main $H_2S$ absorber column and CO-shift section in a conventional Selexol unit (needed to remove any $H_2S$ formed via the COS hydrolysis reaction in the CO-shift section) can be eliminated. The Selexol solvent regenerator and subsequently the recycle loop and solvent circulation rate will be significantly reduced since the solvent has to absorb exclusively $CO_2$. Even more, the solvent might not require refrigeration for the same reason. The Claus unit for sulfur recovery will be eliminated, however a process unit to manage the $SO_2$ generated in the integrated desulfurization and shift process will still be needed. An estimate of the capital cost impact on the Selexol unit if the feed to the unit would have no COS and 10 ppm $H_2S$, came down to 35% less compared to the base case. The base case consisted of a unit with 20.3 MM m$^3$ feed rate with 0.8 vol-% $H_2S$ and 40 ppmv COS in the feed. The estimate was done by deleting the no longer required equipment for the sulfur removal section of the unit and keeping the solvent regenerator to process a slipstream of the circulating solvent to the bulk $CO_2$ removal section to eliminate the possibility of contaminants build-up in the recycle loop. In this cost estimate the refrigeration package for the Selexol unit and the Claus sulfur recovery unit were not eliminated. The proposed integrated sulfur removal and CO-shift unit would consist of two large swing-bed chambers alternating between absorption/shift and regeneration. The desulfurization and CO-shift temperatures could be from 250° to 550° C. and pressures from 10 to 80 bar while the oxidative regeneration temperatures could be from 350° to 600° C. and pressures from 10 to 80 bar. The oxidative regeneration generates a stream of $SO_2$ in $N_2$. The catalysts and adsorbents used in the present invention are subject to regeneration by use of air or oxygen at elevated temperatures to burn off or otherwise remove impurities as known to those skilled in the art.

Figure 2:
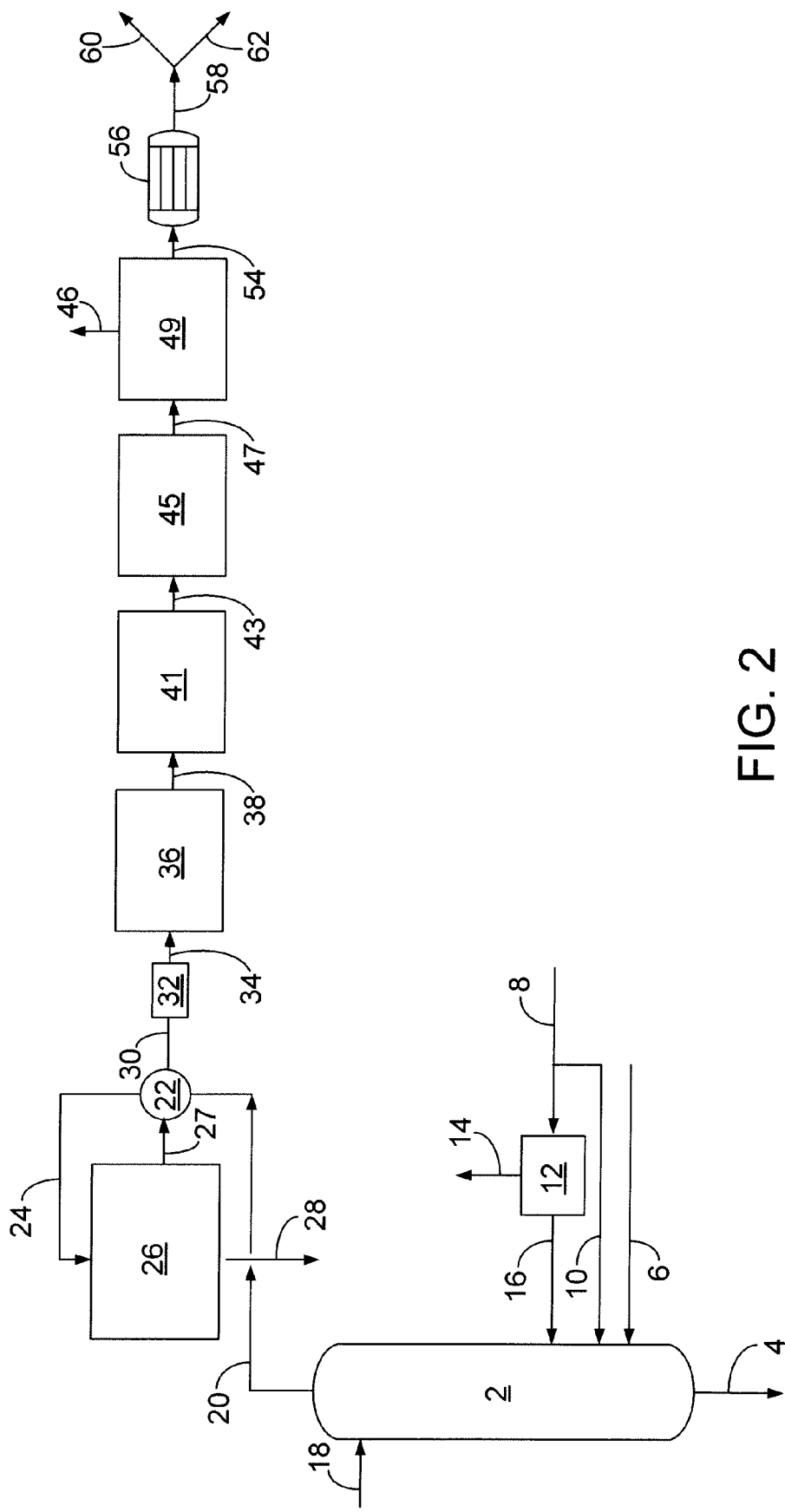
FIG. 2 shows the integrated unit for the complete removal of sulfur compounds plus a CO-shift process in which adsorbent beds are used for removal of carbon dioxide and other impurities.

The process of the present invention is shown in FIGS. 1 and 2. In FIG. 1 is shown the purification of a gaseous stream originating from a direct water quench coal gasifier comprising an integrated desulfurization and carbon monoxide shift unit, an additional optional carbon monoxide shift unit and a solvent based purification unit operating at temperatures above 250° C. In FIG. 1 is shown a quench gasifier 2 into which is sent steam through line 6. A portion of compressed air 8 goes into air separation unit 12 with nitrogen 14 removed and from which oxygen 16 is seen entering quench gasifier 2 and the remainder of the compressed air is shown as entering quench gasifier 2 in line 10. Coal 18 enters a top portion of quench gasifier 2. Black mud 4 is shown being removed through line 4. The product of the quench gasifier is a quenched raw fuel gas in line 20 that is at an exit temperature between about 240° and 285° C. This fuel gas contains carbon monoxide, carbon dioxide, water, <0.1% methane, and <2% of other impurities including nitrogen, hydrogen sulfide, carbonyl sulfide, ammonia, mercury, arsenic, hydrogen cyanide and 1-4 ppmv nickel and iron carbonyls. The quenched raw fuel gas is then heated, as necessary, to between 250° and 550° C. by heat exchanger 22 and then enters an integrated unit 26 for the complete $H_2S$ and COS removal and CO shift through line 24. A solid catalyst is contained within the integrated unit to facilitate these reactions. This solid catalyst may function as a catalyst or also may function as an adsorbent. The partially treated gas exits integrated unit 26 through line 27, passing through heat exchanger 22 into line 30, heat recovery unit 32 and line 34 into a sweet CO shift reactor 36 (operating at about 250° C.) to increase the proportion of CO converted to $CO_2$. Diluted $SO_2$ exits at line 28. The sweetened gas stream exits in line 38 to heat recovery unit 40 to line 42 and then to solvent based purification unit 44 that operates at a temperature lower than 250° C. and in some solvent based systems operates at a temperature of about 40° C. Carbon dioxide is shown being removed in line 46 and other contaminants removed as well in unit 44, including mercury, arsenic, selenium, ammonia, hydrogen cyanide, metal carbonyls and nitrogen. The cold cleaned gas 58 that is removed is largely comprised of hydrogen gas which can be used in production of electricity 60 or chemicals and fuels 62.

In FIG. 2 is shown the purification of a gaseous stream originating from a direct water quench coal gasifier comprising an integrated desulfurization and carbon monoxide shift unit, an additional optional carbon monoxide shift unit and units for the removal of other impurities at 250° C. In FIG. 2 is shown a quench gasifier 2 into which is sent steam through line 6. A portion of compressed air 8 goes into air separation unit 12 with nitrogen 14 removed and from which oxygen 16 is seen entering quench gasifier 2 and the remainder of the compressed air is shown as entering quench gasifier 2 in line 10. Coal 18 enters a top portion of quench gasifier 2. Black mud 4 is shown being removed through line 4. The product of the quench gasifier is a quenched raw fuel gas in line 20 that is at an exit temperature between about 240° and 285° C. This fuel gas contains carbon monoxide, carbon dioxide, water, <0.1% methane, and <2% of other impurities including nitrogen, hydrogen sulfide, carbonyl sulfide, ammonia, mercury, arsenic, hydrogen cyanide and 1-4 ppmv nickel and iron carbonyls. The quenched raw fuel gas is then heated, as necessary, to between 250° and 550° C. by heat exchanger 22 and then enters an integrated unit 26 for the complete $H_2S$ and COS removal and CO shift through line 24. A solid catalyst is contained within the integrated unit to facilitate these reactions. This solid catalyst may function as a catalyst or also may function as an adsorbent. The partially treated gas exits integrated unit 26 through line 27, passing through heat exchanger 22 into line 30, heat recovery unit 32 and line 34 into a sweet CO shift reactor 36 (operating at about 250° C.) to increase the proportion of CO converted to $CO_2$. Diluted $SO_2$ exits at line 28. The sweetened gas passes through line 38 to adsorbent bed 41 to remove mercury, arsenic and selenium, to line 43 to adsorbent bed 45 to remove ammonia and hydrogen cyanide to line 47 to adsorbent bed 49 to remove carbon dioxide seen being removed at 46. Nitrogen and metal carbonyls are also removed in these adsorbent beds. The adsorbent beds operate at about 250° C. for removal of the impurities. The adsorbent beds may be regenerated through the use of a flow of heated air or oxygen or other gas as known to those skilled in the art. The purified gas passes through line 54 to candle filter 56 to remove particulates. The cold cleaned gas 58 that is removed is largely comprised of hydrogen gas which can be used in production of electricity 60 or chemicals and fuels 62.

The invention claimed is:

1. A process for purifying a gas stream comprising:
   a) purifying said gas stream in a temperature swing-bed at a temperature from about 250° to 550° C. and a pressure from about 10-80 bar wherein said purification comprises removing sulfur compounds and a CO gas shift reaction to convert carbon monoxide to carbon dioxide to produce a partially purified gas stream using a solid catalyst for said removal of sulfur compounds and to catalyze said CO gas shift reaction; and
   b) removing said carbon dioxide and other impurities from said partially purified gas stream.

2. The process of claim 1 wherein said gas stream is a fuel gas stream.

3. The process of claim 1 wherein said gas stream is a synthesis gas stream.

4. The process of claim 3 wherein said synthesis gas stream comprises hydrogen, carbon monoxide, carbon dioxide, water, sulfur compounds and other impurities.

5. The process of claim 1 wherein after said purified gas stream is subjected to a second CO gas shift to transform a further amount of CO to $CO_2$.

6. The process of claim 1 wherein said partially purified gas stream is cooled and then further purified with a solvent based purification system to remove carbon dioxide and other impurities.

7. The process of claim 1 wherein said partially purified gas stream is cooled to about 40° C. and purified by a physical solvent comprising a mixture of dimethyl ethers of polyethylene glycol to remove carbon dioxide and other impurities.

8. The process of claim 1 wherein said other impurities comprise ammonia, nitrogen, hydrogen cyanide, trace levels of metal carbonyls, mercury and arsenic and compounds thereof.

9. The process of claim 1 wherein said other impurities are removed by one or more adsorbent beds at a temperature of about 250° C.

10. The process of claim 8 wherein mercury, arsenic and selenium containing impurities are removed in an adsorbent bed, ammonia and hydrogen cyanide are removed in a second adsorbent bed and carbon dioxide is removed in a third adsorbent bed to produce a cleaned hydrogen stream.

11. The process of claim 1 wherein said solid catalyst is regenerated in the presence of oxygen at a temperature from about 350° to 600° C.

12. The process of claim 11 wherein said regeneration generates a stream of $SO_2$ to be removed.

13. The process of claim 10 wherein said cleaned hydrogen stream is filtered to remove particulates.

14. A process for purifying a gas stream comprising:
   a) purifying said gas stream in a temperature swing-bed at a temperature from about 250° to 550° C. and a pressure from about 10-80 bar wherein said purification comprises removing $H_2S$, and converting COS to $H_2S$, and a CO gas shift reaction to convert carbon monoxide to carbon dioxide to produce a partially purified gas stream using a solid catalyst to remove said $H_2S$ and to convert COS to $H_2S$ and to catalyze said CO gas shift reactor; and
   b) removing said carbon dioxide and other impurities from said partially purified gas stream.

15. The process of claim 14 wherein said gas stream is a fuel gas stream.

16. The process of claim 14 wherein said gas stream is a synthesis gas stream.

17. The process of claim 16 wherein said synthesis gas stream comprises hydrogen, carbon monoxide, carbon dioxide, water, sulfur compounds and other impurities.

18. The process of claim 14 wherein said purified gas stream is subjected to a second CO gas shift to transform a further amount of CO to $CO_2$.

19. The process of claim 14 wherein said partially purified gas stream is cooled and then further purified with a solvent based purification system to remove carbon dioxide and other impurities.

20. The process of claim 14 wherein said partially purified gas stream is cooled to about 40° C. and purified by a physical solvent comprising a mixture of dimethyl ethers of polyethylene glycol to remove carbon dioxide and other impurities.

21. The process of claim 14 wherein said other impurities comprise ammonia, nitrogen, hydrogen cyanide, trace levels of metal carbonyls, mercury and arsenic and compounds thereof.

22. The process of claim 14 wherein said other impurities are removed by one or more adsorbent beds at a temperature of about 250° C.

23. The process of claim 22 wherein mercury, arsenic and selenium containing impurities are removed in an adsorbent bed, ammonia and hydrogen cyanide are removed in a second adsorbent bed and carbon dioxide is removed in a third adsorbent bed to produce a cleaned hydrogen stream.

24. The process of claim 14 wherein said solid catalyst is regenerated in the presence of oxygen at a temperature from about 350° to 600° C.

25. The process of claim 24 wherein said regeneration generates a stream of $SO_2$ to be removed.

26. The process of claim 23 wherein said cleaned hydrogen stream is filtered to remove particulates.

* * * * *